(12) United States Patent
Üstün et al.

(10) Patent No.: US 10,225,490 B2
(45) Date of Patent: Mar. 5, 2019

(54) MOBILE STUDIO AND METHOD FOR USING MOBILE STUDIO

(71) Applicant: HITACHI KOKUSAI ELECTRIC INC., Tokyo (JP)

(72) Inventors: Ahmet Üstün, Istanbul (TR); Kiyoshi Funada, Istanbul (TR); Shinichi Miyazaki, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 19 days.

(21) Appl. No.: 15/669,244

(22) Filed: Aug. 4, 2017

(65) Prior Publication Data
US 2017/0339350 A1  Nov. 23, 2017

Related U.S. Application Data

(63) Continuation-in-part of application No. PCT/JP2016/056413, filed on Mar. 2, 2016.

(30) Foreign Application Priority Data

Mar. 9, 2015 (JP) .................................. 2015-046084

(51) Int. Cl.
*B62D 39/00* (2006.01)
*H04N 5/28* (2006.01)
(Continued)

(52) U.S. Cl.
CPC ................ *H04N 5/28* (2013.01); *B60P 3/00* (2013.01); *B60P 3/14* (2013.01); *B60P 3/025* (2013.01)

(58) Field of Classification Search
CPC ..... H04N 5/28; B60P 3/00; B60P 3/14; B60P 3/025
See application file for complete search history.

(56) References Cited

U.S. PATENT DOCUMENTS 2,846,262 A * 8/1958 Ray ........................ B60J 7/102
                                                      114/361
5,183,375 A * 2/1993 Fenton ..................... B60P 7/13
                                                      206/503
(Continued)

FOREIGN PATENT DOCUMENTS

JP          3937/1990         1/1990
JP        13431/1992 U        2/1992
(Continued)

OTHER PUBLICATIONS

International Search Report and Written Opinion from International Application No. PCT/JP2016/056413 dated May 10, 2016, 6 pages.

*Primary Examiner* — Lori L Lyjak
(74) *Attorney, Agent, or Firm* — Brundidge & Stanger, P.C.

(57) ABSTRACT

A mobile studio and a method for using the mobile studio are disclosed. The mobile studio is provided with lower and upper frameworks. A lower framework includes a planar upper-tier frame and a planar lower-tier frame, the planar upper-tier frame has a connecting tab to secure the mobile studio to a vehicle. An upper framework is secured to the lower framework. The upper framework supports at least a production area. Preferably, the upper framework supports a storage area including a rack assembly. Preferably, the rack assembly faces a rear door, at least part of the rack assembly having a sound insulating material. The method for using the mobile studio is provided with securing a bracket onto the chassis of the vehicle, loading the mobile studio onto the bracket, and securing the mobile studio to the vehicle using the connecting tab.

12 Claims, 18 Drawing Sheets

(51) Int. Cl.
  B60P 3/00 (2006.01)
  B60P 3/14 (2006.01)
  B60P 3/025 (2006.01)

(56) References Cited

U.S. PATENT DOCUMENTS

| | | | | |
|---|---|---|---|---|
| 5,280,985 A | * | 1/1994 | Morris | B60P 1/02 296/26.15 |
| 6,807,735 B2 | | 10/2004 | Crean | |
| 7,300,086 B2 | | 11/2007 | Maclean | |
| 2011/0242322 A1 | * | 10/2011 | O'Connell | A63J 5/021 348/148 |

FOREIGN PATENT DOCUMENTS

| | | |
|---|---|---|
| JP | 2000-259073 A | 9/2000 |
| JP | 2010-105432 A | 9/2000 |
| JP | 2003-128182 A | 8/2003 |
| JP | 2007-166055 A | 6/2007 |
| JP | 2008-110655 A | 5/2008 |
| JP | 2013-10420 A | 1/2013 |
| WO | 2010013261 A1 | 2/2010 |

* cited by examiner

Connection diagram of the broadcast equipment, installed in the mobile studio according to an embodiment of the present invention

MOBILE STUDIO AND METHOD FOR USING MOBILE STUDIO

CROSS-REFERENCE TO RELATED APPLICATION

The present application is a continuation-in-part application under 35 U.S.C § 111(a) of International Application No. PCT/JP2016/056413, filed Mar. 2, 2016, which claims priority to Japanese Patent Application No. 2015-046084, filed Mar. 9, 2015. The contents of these applications are incorporated herein by reference in their entirety.

TECHNICAL FIELD

The present invention relates to a mobile studio being removably mountable on a chassis of vehicle, the mobile studio being available for operating in the television industry such as outdoor broadcasting and electronic news gathering. In addition, the present invention relates to a method for using the mobile studio.

BACKGROUND

Conventionally, a relay vehicle including a set of broadcast equipment is known for coverage, production, and transmission of the TV program outdoors. For example, as disclosed in the Patent Document 1, such a relay vehicle is referred to as an Outside Broadcast Van (OB-Van).

According to the progress of the recent network technologies and the ripening of digital video technologies, a big change is occurring to the relay vehicle. For example, a broadband optical fiber line, having large data capacity so as to be incomparable with the capacity of the satellite line, can be provided in the public event place or arena. Thus, the video information at the site can be delivered to the head office of broadcasting company with a non-compression and low delay. This means that the operations which have been conducted by video engineers in the relay vehicle can be remotely conducted at the head office. In addition, the authoring software, operating even on a general personal computer, can work to maintain a sufficient quality of the video for a business use. The video contents that have conventionally been recorded on dedicated tape mediums can be stored in a commercially available USB thumb drive. An intercom to use for a conversation of a cameraman and a video technician may be replaced for the function of IP telephone in the WiFi terminal. Internet Protocol Television (IPTV) is a typical application of commoditized network technologies. IPTV has been realized as a service without relying mostly on special protocols by the organization of the television industry.

The benefits of the release from a bundle of cables or scalability can be obtained certainly in packet-switched networks, such as Ethernet®, as compared to the circuit-switched of the baseband signals. In a simple example, the conventional two 4×4 matrix switches are not used as a substitute for 8×8 switches. However, if the switch is based on Ethernet®, it is possible that 4×4 switches work as 8×8 switches by connecting between them with a single fiber simply.

When applying Ethernet® in audiovisual equipment, it is necessary to maintain sufficient reliability so as to overcome problems including latency and network connection failure. In consideration of them, Ethernet® Audio-Video Bridging (AVB) was standardized by The Institute of Electrical and Electronics Engineers Inc. (IEEE) 802.1 Standardization Committee. Although AVB switches in conformity with the AVB are available at present, the protocol implemented by each device manufacturer may be independently as if combating commoditization, the compatibility between different manufacturers, it may be necessary to make sure before system construction.

A user, intending to operate a relay vehicle system, should determine the ratio of the networking based at least in part on the application (especially, live broadcast or not) or the communication environment. The network may be diversified from a conventional type using a satellite link to a cloud type. In addition, the user may expect interoperability or integration with the system at the headquarters, upgrading to a new video format, and supporting new functions such as live remote editing or file-based workflow. The user may desire to expand the ability for future use. It may be necessary to carefully determine the trunk network of the relay vehicle by using the equipment of what manufacturer. Thus, the need for the relay vehicle system is diversified, the manufacturer of the relay vehicle is required to deliver the relay vehicle in a short period under applying the system design which meets customer's need.

The design and production of the relay vehicle system are basically performed by receiving an order. Producers purchased the vehicle or the frame of the vehicle identified by the user, constructed a box-shaped production area on the part of carrier, installed a variety of equipment therein, and conducted the quality inspection. The completed relay vehicle is delivered to the purchaser of the country, through a customs clearance, by the importers/exporters. However, in order to be able to travel as an automobile, it is necessary to vehicle registration of the country, there is a problem that it takes a considerable number of days. The problem is also applied to getting an insurance or maintenance contract for starting the actual operation of relay vehicle.

THE PRIOR ART LITERATURE

Patent Document

Patent Document 1: International Publication No. 2010/013261 A1 Pamphlet
Patent Document 2: U.S. Pat. No. 7,300,086
Patent Document 3: Japanese patent application laid-open No. 2007-166055

SUMMARY OF THE INVENTION

A mobile studio according to one aspect of the present invention includes a lower framework, having a planar upper-tier frame constructed of a first longitudinal beam and a first lateral beam, and a planar lower-tier frame constructed of a second longitudinal beam and a second lateral beam, the planar upper-tier frame being connected with the planar lower-tier frame by a plurality of columns, the planar upper-tier frame having a connecting tab to secure the mobile studio to a vehicle while the mobile studio mounting on the vehicle; and an upper framework, secured to the lower framework, the upper framework supporting at least a production area in the mobile studio.

Preferably, the upper framework further supports a storage area.

Preferably, the storage area includes rack assembly, facing a rear door, at least part of the rack assembly being made of sound insulating material. As the mobile studio can be separated as production area and storage area by rack assembly, equipment like a camera can be stored so as to take out easily. Preferably, the rack assembly is facing a rear door to access the equipment from outside through the rear door. Preferably, at least part of the rack assembly can be made of sound insulating material so that the production area can be insulated sound from outside.

Preferably, the lower framework supports an electric distribution board having at least a terminal for cascaded connection to another mobile studio, the electric distribution board being disposed on the opposite side of a driver's side when the mobile studio is mounted on the vehicle. As the electric distribution board, being often accessed, can be arranged at other side of a driver's seat, in other words, the electric distribution board can be arranged toward the sidewalk side or pedestrian walkway side. Thus, the operator can perform connection work safely.

Preferably, the terminal works to carry Audio Video Bridging (AVB) signal using AVB network.

Preferably, cascade connection interface at the electrical distribution board includes a terminal for connecting a signal of media converter with other conventional equipment.

Preferably, cascade connection interface at the electrical distribution board includes a terminal for connecting a signal of AVB router with other OB-Box or AVB equipment.

Preferably, the production area includes an extension, being retracted into the production area so as to form a box-shaped mobile studio while transporting the mobile studio.

Preferably, the mobile studio is connected with the vehicle using the connecting tab of the planar upper-tier frame and a bracket secured the vehicle, without interfering with the planar lower-tier frame. The connecting tab is attached to the planar upper-tier frame of the lower framework. By attaching the connection tab to the planar upper-tier frame of the lower framework, strength of the connection between the mobile studio and the vehicle increases. The connection tab facilitates that the mobile studio is secured to the vehicle detachably.

Preferably, the connection tab is attached to a lateral beam of a planar upper-tier frame of the lower framework.

Preferably, lifting points are provided at least at the four corners of a roof, supported by the upper framework.

Preferably, at least part of the lower framework can be formed of the Rahmen or grid structure constituted of steel or iron square pipes to obtain the structural strength for supporting the mobile studio including extensions.

Preferably, at least part of the upper framework can be formed of the Rahmen or grid structure constituted of aluminum square pipes to make light weight.

A method for manufacturing mobile studio according to one aspect of the present invention includes the steps of: (1) constructing a lower framework, having steel Rahmen structure with a connecting tab to secure the mobile studio to a vehicle; (2) constructing an upper framework, having aluminum Rahmen structure to support at least production area including an extension; and (3) securing the upper framework to lower framework.

A method for using a mobile studio according to one aspect of the present invention includes the steps of: (1) providing a mobile studio, the mobile studio includes a lower framework, having a planar upper-tier frame constructed of a first longitudinal beam and a first lateral beam, and a planar lower-tier frame constructed of a second longitudinal beam and a second lateral beam, the planar upper-tier frame being connected with the planar lower-tier frame by a plurality of columns, the planar upper-tier frame having a connecting tab to secure the mobile studio to a vehicle; and an upper framework, secured to the lower framework, the upper framework supporting at least a production area in the mobile studio; (2) providing a vehicle having a chassis to mount the mobile studio thereon; (3) securing a bracket onto the chassis of the vehicle; (4) loading the mobile studio onto the bracket; and (5) securing the connecting tab of the planar upper-tier frame of the lower framework to the bracket of the vehicle.

Preferably, in step (4), loading the mobile studio to the bracket is performed by lifting the mobile studio in a winch, then lowering the mobile studio to the bracket.

Furthermore, a method for using a mobile studio according to one aspect of the present invention includes the steps of: (1) providing a mobile studio under the state that the mobile studio is secured to a vehicle, the mobile studio includes a lower framework and an upper framework, the lower framework has a planar upper-tier frame connected with the vehicle, the upper framework supports at least a production area and storage area, the production area and the storage area is separated by a rack assembly. Preferably, the production area includes an extension having broadcast equipment. Preferably, the lower framework supports an electric distribution board having at least a terminal for cascaded connection to another mobile studio, the electric distribution board being disposed on the opposite side of a driver's side; (2) extending the extension laterally for the vehicle traveling direction; and (3) connecting the broadcast equipment with the other equipment in another mobile studio via the terminal. Preferably, the terminal works to carry Audio Video Bridging (AVB) signal using AVB network.

By extending the extension laterally for the vehicle traveling direction, operator in the mobile station can access any one of broadcast equipment through a walking through space in the production space conveniently. By retracting the extension into the body of the mobile station, the mobile station can transport compactly.

Furthermore, a mobile studio according to one aspect of the present invention includes a lower framework having a connecting tab to secure the mobile studio to a vehicle; and an upper framework, secured to the lower framework, the upper framework supporting at least a production area in the mobile studio.

Preferably, the production area includes an extension having a console of broadcast equipment and a slider for being drawn laterally while managing the broadcast equipment and retracted into the production area while transporting the mobile studio.

Preferably, the upper framework further supports a storage area.

Preferably, the storage area includes rack assembly, facing a rear door, at least part of the rack assembly being made of sound insulating material.

Preferably, the rack assembly is facing a rear door to access the equipment from outside through the rear door.

As the mobile studio can be separated as production area and storage area by rack assembly, equipment like a camera can be stored so as to take out easily. As at least part of the rack assembly can be made of sound insulating material, the production area can be insulated sound from outside.

Furthermore, a mobile studio according to one aspect of the present invention may include a lower framework made of steel as a base material, an upper framework made of aluminum as a base material and brackets for connecting the lower framework with a vehicle. The mobile studio may be formed into a rectangular parallelepiped box shape or a cuboid box shape roughly. The mobile studio can be mounted onto the vehicle as a cargo.

Preferably, the lower framework may include a planar upper-tier frame constructed by putting a first longitudinal beam and a first lateral beam together, a planar lower-tier frame constructed by putting a second longitudinal beam and a second lateral beam together, and a plurality of columns for connecting the upper-tier frame and the lower-tier frame. The brackets may be connected to the upper-tier frame of the lower framework without interfering with the lower-tier frame of the lower framework. In addition, lifting points may be provided at least at the four corners of a roof, supported by the upper framework. The mobile studio formed into a rectangular parallelepiped box shape or a cuboid box shape roughly, can stand itself. In other words, the mobile studio can be placed directly on the ground.

Furthermore, a method for mounting a mobile studio on a vehicle according to one aspect of the present invention, the method including: assembling the above mentioned mobile studio on a first platform (not illustrated); setting up the mobile studio to operate as a studio by installing studio equipment into the mobile studio on the first platform; putting the mobile studio onto a second platform for transportation from the first platform; and putting the mobile studio onto the vehicle from the second platform.

According to one aspect of the present invention, it is possible to provide a user with the relay vehicle in a short period of time because the mobile studio having modular structure can be installed to a chassis of a vehicle in the country of the user, the chassis of the vehicle being supplied in the country of the user.

DESCRIPTION OF THE PREFERRED EMBODIMENTS

Figure 10:
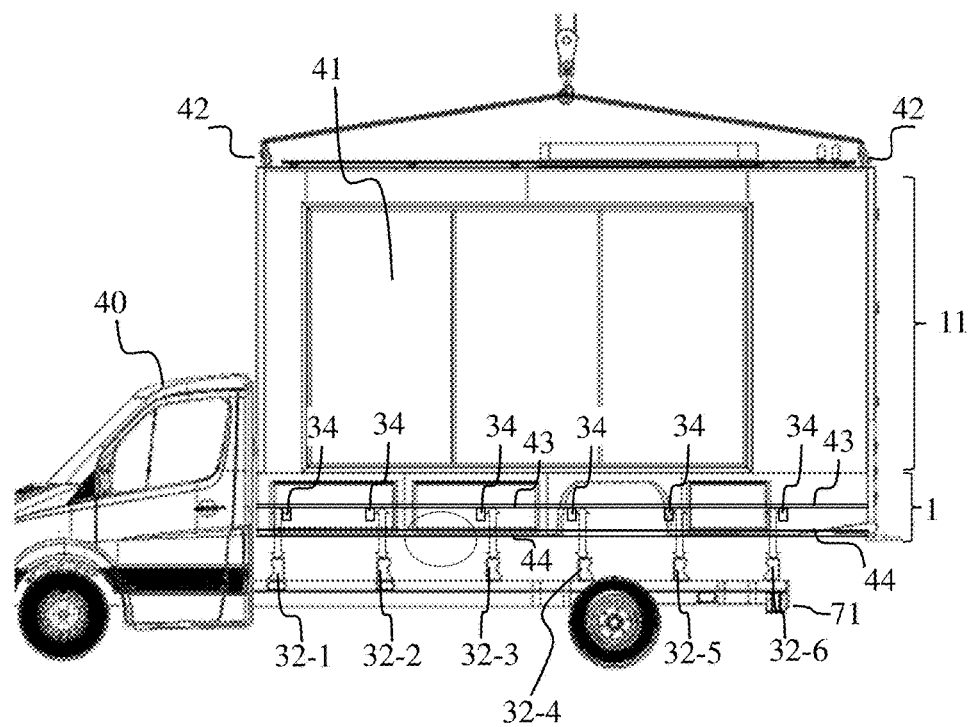
FIG. 10 illustrates the state of a mobile studio being lifted out of the chassis according to an embodiment of the present invention.

A mobile studio according to an embodiment of the present invention, hereinafter referred to as "OB-Box", may have approximately rectangular parallelepiped basic structure, as shown in FIG. 10, can be easily mounted on a chassis of a vehicle like a cargo.

[Configuration of OB-Box]

Hereinafter, along the manufacturing process of OB-Box, configuration of OB-Box is explained.

At Step S1, the design with respect to OB-Box is determined based on the meeting with the user. The design includes an appearance, dimensions of OB-Box, an interior, interior spatial arrangements, relates mechanical equipment, a system to be installed, a scale of the system, or choice of individual electronic equipment. The design is adjusted according to user's operation in the mobile studio. Firstly, the number of cameras to be handled by OB-Box should be determined. According to the determined number of cameras, the spaces for storing the cameras or installation space of Camera Control Unit (CCU) are determined, thus approximate dimensions of OB-Box can be determined. When the approximate dimensions of OB-Box are determined, a base vehicle having a capable of mounting OB-Box can be determined. Then, detailed designs are started.

Figure 1:
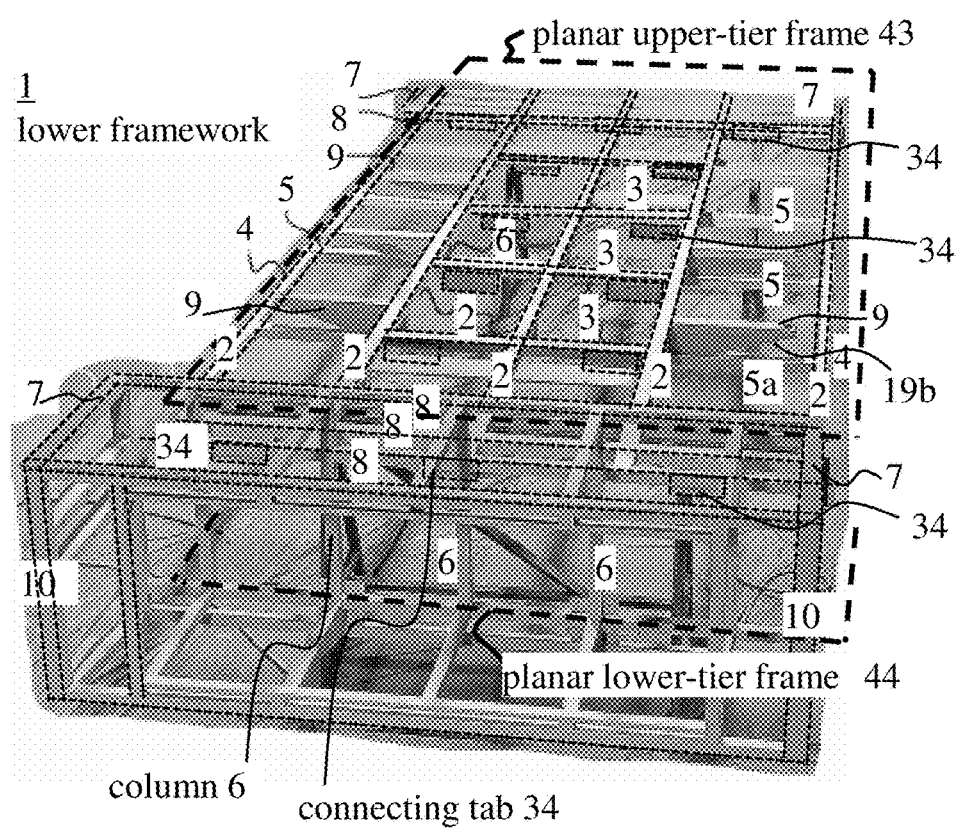
FIG. 1 illustrates a lower framework of a mobile studio according to an embodiment of the present invention.
Figure 11:
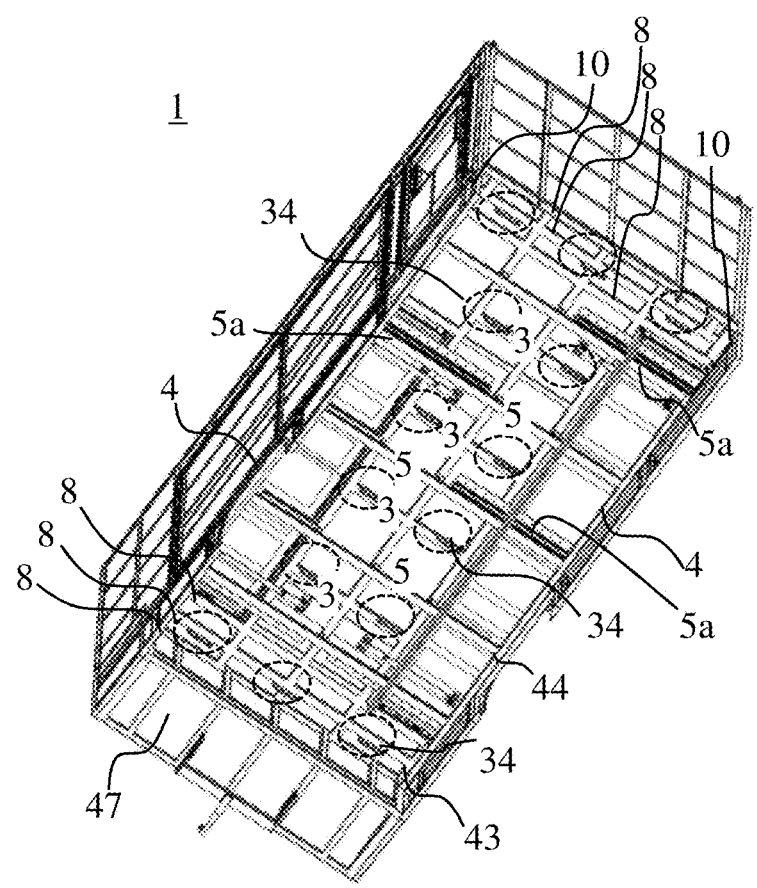
FIG. 11 is a perspective view of a lower framework according to an embodiment of the present invention, the perspective view showing the bottom surface of the lower framework.
Figure 15:
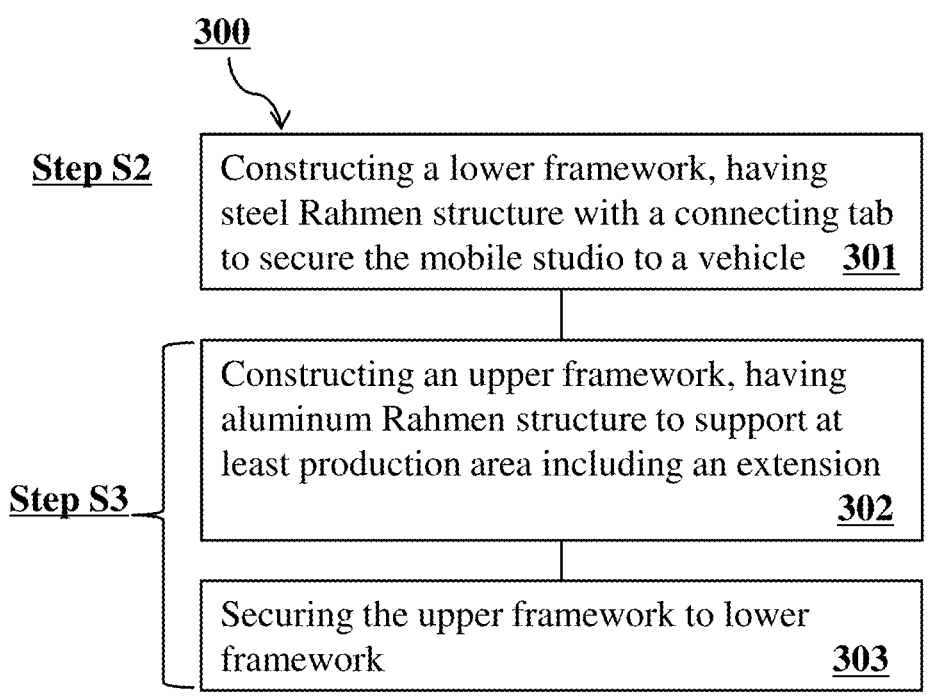
FIG. 15 is a flow diagram of an example method for manufacturing a mobile studio.

As shown at Step S2, illustrated in FIG. 15, lower framework 1 of OB-Box is fabricated (301 in FIG. 15). As shown in FIGS. 1 and 11, lower framework 1 constitutes at least a part of the floor of the production area of OB-Box, or a space at a rear lower part of OB-Box. Lower framework 1 has the Rahmen frame structure (in other words, moment resisting frame or rigid-jointed frame), arranged so as to form a lattice shape, by using a plurality of steel square pipes, for example, the sectional size of the pipe is 60 mm×40 mm Lower framework 1 is constituted by combining a plurality of steel-made square pipes in upper and lower direction, left and right direction, forward and backward direction, so as to form a lattice shape to support a weight of OB-Box. The materials of the square pipe may be high strength materials such as the steel or iron to get strength. According to such the steel Rahmen structure, lower framework 1 can get enough strength to be suspended with upper framework 11 under keeping lightweights.

FIG. 11 is a perspective view showing the bottom surface of OB-Box, particularly, looked up the bottom surface of lower framework 1 from the lower side. As illustrated in FIG. 11, Lower framework 1 includes planar upper-tier frame 43 located above the rear tire with sufficient clearance, and planar lower-tier frame 43 prolonged for approximately 100 mm to 150 mm downward from the bottom of the upper layer.

As illustrated in FIG. 1, planar upper-tier frame 43 has a plurality of longitudinal beams 2 in the longitudinal direction of the vehicle, longitudinal beams 2 being arranged along the vehicle traveling direction. For example, one of the longitudinal beams 2 can be arranged on the middle line in the transverse direction for the vehicle traveling direction. In addition, the other longitudinal beams 2 can be arranged in parallel at the left or right position, being apart from the middle line in the transverse direction for the vehicle traveling direction. An interval in the transverse direction for the vehicle traveling direction, between the left and right longitudinal beams, can be set about ½ to ⅓ length of the width of OB-Box.

Planar upper-tier frame 43 has a plurality of lateral beams 3 in the transverse direction for the vehicle traveling direction. In other words, each lateral beam 3 is arranged in a right angle to a vehicle traveling direction. For example, lateral beam 3 is arranged so as to connect a plurality of longitudinal beams 2. Lateral beam 3 has a part, being mounted directly on a bracket of the vehicle. The bracket will be described later. Connecting tab 34, for example, made by steel, having a bolt hole for connecting lateral beam 3 with the bracket on a chassis of the vehicle, is bonded or fastened to the side surface of lateral beam 3 so that at least part of connecting tab 34 projects downward from the bottom surface of lateral beam 3 to secure lateral beam 3 to the bracket of the vehicle detachably. Connecting tab 34, made by a steel plate, connects lateral beam 3 of planar upper-tier frame 43 of lower framework 1 with the bracket on the chassis of the vehicle by being fastened with the bolt. A position of lower framework 1 to attach connecting tab 34 does not limited to lateral beam 3 of planar upper-tier frame 43. Connecting tab 34 can be attached to longitudinal beam 2 of planar upper-tier frame 43 of lower framework 1 or other place so as to ensure sufficient supporting strength. A position of the vehicle to attach connecting tab 34 does not limited to the bracket on the chassis of the vehicle. Connecting tab 34 can be attached to the chassis of the vehicle directly. By using connecting tab 34, a part of lower framework 1 of OB-Box is secured to the chassis of the vehicle detachably. As a result that connecting tab 34 is attached to planar upper-tier frame 43 of lower framework 1, a distance between the center of gravity of OB-Box and connecting tab 34 is shorten, then a lateral moment being applied to connecting tab 34 while traveling decreases in comparison with the case that connecting tab 34 is attached to planar lower-tier frame 44 of lower framework 1. Therefore, it is preferable that connecting tab 34 is attached to planar upper-tier frame 43 of lower framework 1 to secure strength of the connection of OB-Box and the vehicle enough.

As illustrated in FIG. 11, planar lower-tier frame 44 has a longitudinal beam 4, arranged at a position that is near to left edge or near to right edge, or arranged at a position that is most left edge or most right edge, in the transverse direction for the vehicle traveling direction. For example, planar lower-tier frame 44 may have at least two longitudinal beams 4, arranged at the left and right sides of OB-Box along the vehicle traveling direction in parallel.

Planar lower-tier frame 44 has a plurality of lateral beams 5 that connects the opposite sides of longitudinal beams 4 in the lateral direction in parallel. The lateral direction means the transverse direction for the vehicle traveling direction. Lateral beams 3 and lateral beams 5 may be arranged alternately at substantially equal intervals. Lateral beam 5 can have linear roller guide 5a for loading extension wheels. Linear roller guide 5a may be integrated to lateral beam 5 by being welded to lateral beam 5. Linear roller guide 5a may be disposed on lateral beam 5. Linear roller guide 5a may be extended from the side edge of OB-Box to the vicinity of the center in a lateral direction, having a right angle to the vehicle traveling direction. Planar upper-tier frame 43 and planar lower-tier frame 44 are connected by column 6 at the connecting portions of the beams each other. Lateral beam 3 may make an open space downwardly around lateral beam 3 if there is no member disposed at the lower layer.

Furthermore, short longitudinal beams 7 may be disposed at the right and left sides in the parts of planar upper-tier frame 43, the parts being not located below the extensions of OB-Box. Lateral beam 8 also connects the opposite sides of OB-Box in the part of planar upper-tier frame 43, the part also being not located below the extensions of OB-Box. The extension is explained later. In the parts being located below the extensions of OB-Box, a short cantilever lateral beam 9 may be disposed above lateral beam 5 of planar lower-tier frame 44. For example, each of the three lateral beams 8 may be disposed at front or rear position of the vehicle, with a narrow interval, respectively. At least one of three lateral beams 8 being allocated at front or rear position of the vehicle, for example, lateral beams 8 located at the middle of three lateral beams 8 at the front or rear position, may be connected to the corresponding bracket 32-1, 32-6 of the vehicle like lateral beam 3 being connected to bracket 32-2, 32-3, 32-4, 32-5. The interval of lateral beams 8 in a vehicle traveling direction at front or rear position of the vehicle may be narrower than the interval of lateral beams 3, 5, positioned at the part other than front or rear position of the vehicle in a vehicle traveling direction. Due to such arrangements, OB-Box can reduce rolling moment experienced by OB-Box when traveling curves and obtain the structural strength for supporting the weight when the OB-Box is separated from the vehicle. Furthermore, lower framework 1 may partly form rear lower space 47, further extended from lateral beam 8 allocated at the rear in a backward direction. In addition, a plurality of columns 10 may be disposed below planar lower-tier frame 44 in the front part of lower framework 1. Column 10 may extend to the same height level as the lower end of rear lower space 47. Column 10 may be disposed at least at the front corner of OB-Box. Thus, OB-Box can support its own weight by placing the edge of column 10 and the lower end of the frame which constitutes rear lower space 47 on the ground directly.

As column 9 may be disposed between columns 5 for supporting the extension, column 9 may be strengthened mechanically by having a truss structure, welded a steel sheet lengthwise for constituting I-shaped beam. Lower framework 1 may be provided rust prevention or painting after welding.

At Step S3, illustrated in FIG. 15, upper framework 11 of OB-Box is fabricated (302 in FIG. 15). Upper framework 11 is constructed by assembling square pipes together into a lattice form for forming the flames for the side walls or the roof of OB-Box. The materials of the square pipe for upper framework 11 may be lightweight materials such as aluminum to make light weight. In this way, upper framework 11 may have an aluminum Rahmen structure. A framework for the roof may be strengthened mechanically for supporting heavy goods to put on the roof and withstanding the compressive stress during lifting OB-Box. Because water does not accumulate on the roof, the roof may be provided by slightly inclined. At least each of the four corners of the roof of upper framework 11, for example, the upper end of the column located at least at four corners of upper framework 11, may have a screw hole for attaching the eyebolt for lifting as lifting point 42, respectively. Upper framework 11 may be secured to lower framework 1, for example, using a bolt (303 in FIG. 15).

At Step S4, body 13 of OB-Box is formed by attaching an outer shell, for example, the outer shell being made of an aluminum board having a thickness of 2 mm The roof of OB-Box may be formed by attaching an aluminum alloy board having a thickness of 4 mm An outer shell of lower framework 1 may be formed by attaching some materials other than aluminum material, for example, by attaching waterproof plywood. At this fabricating stage, for example, a drain tube of rain water may be installed in OB-Box.

At Step S5, left and right extensions 15, 16 are assembled and attached to OB-Box. In a photographing site, each of extensions 15, 16 provides a feature to extend an internal space of the mobile studio laterally and horizontally, respectively. Each of extensions 15, 16 has the structure of the cantilever dynamically. Each of extensions 15, 16 includes a framework welded aluminum pipes in a lattice shape, an outer shell made of an aluminum board and a plurality of lateral beams 17, 18. Lateral beams 17, 18 are disposed under a bottom surface of extension 15, 16 so as to be projected in a lateral direction and preferably made of steel. Lateral beam 17, corresponding to planar lower-tier frame 44 of lower framework 1, has slider 48, corresponding to liner roller guide 5a, disposed on lower framework 1. Liner roller guide 5a can withstand an upward or downward load when expanding or storing extension 15, 16, and slide lateral beam 17 while keeping horizontally. Lateral beam 18, corresponding to planar upper-tier frame 43 of lower framework 1, has a cross-section shape so as to correspond to wheel 19b from the upper side, wheel 19b being provided on the end of lateral beam 9. After extensions 15, 16 are retracted into the body of OB-Box, some linear actuators may be provided between lower framework 1 and extension 15, 16.

Figure 2:
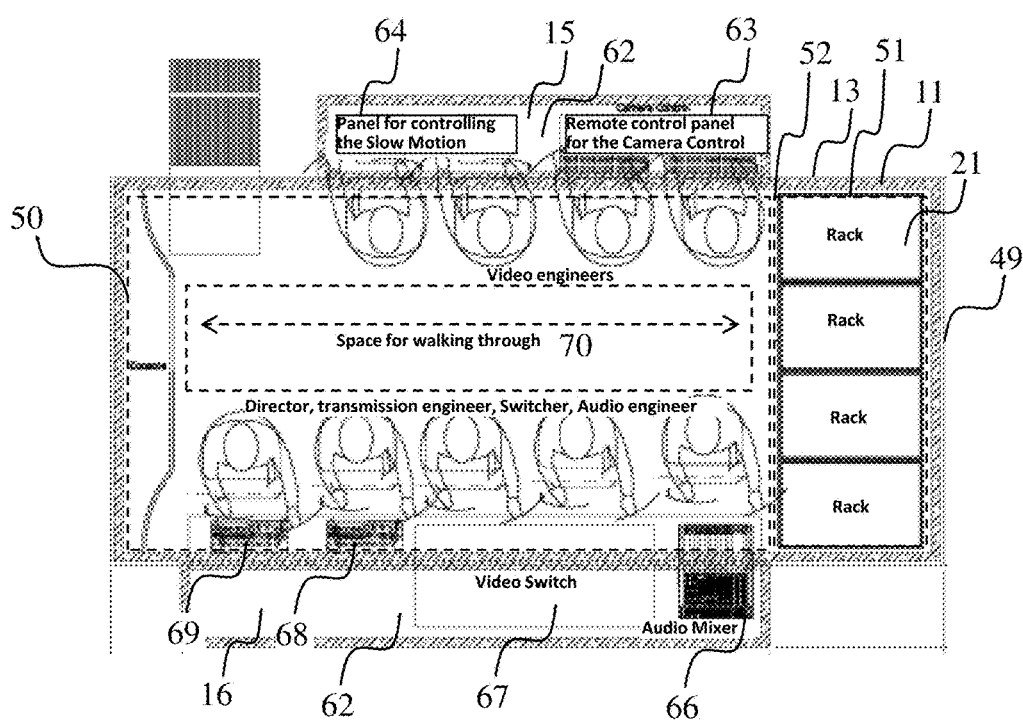
FIG. 2 illustrates an internal layout of a mobile studio (top view) according to an embodiment of the present invention.
Figure 3:
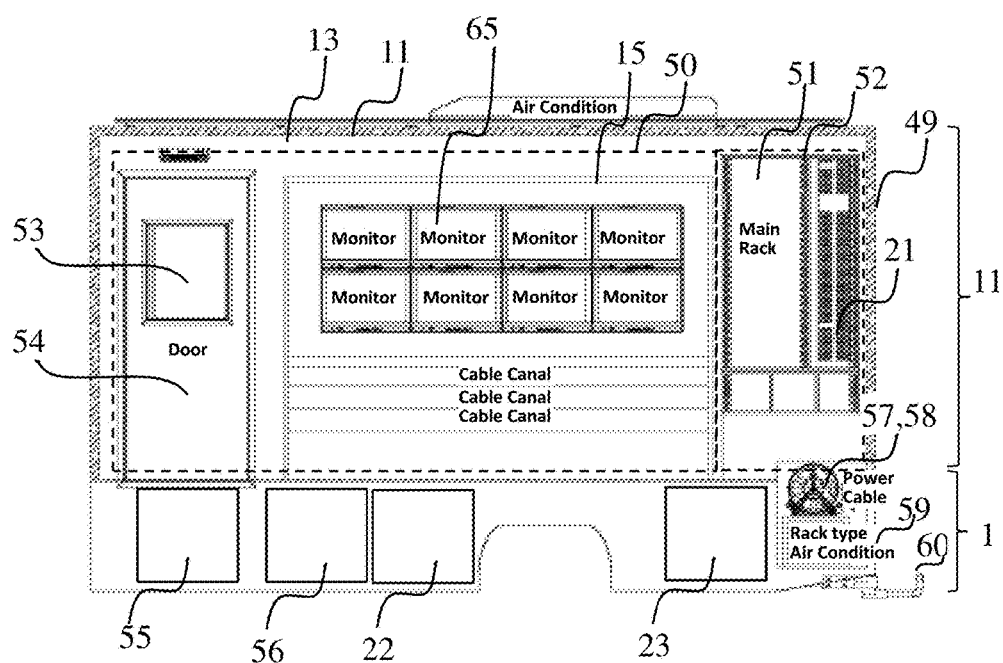
FIG. 3 illustrates an internal layout of a mobile studio (left side view) according to an embodiment of the present invention.

At Step S6, materials including an acoustic insulation material, a part of the floor, interior or a rack for broadcast equipment are installed to OB-Box. Basic electrical cables or ducts are installed to OB-Box. FIGS. 2 and 3 illustrate an internal layout of OB-Box. The inner packaging of OB-Box is separated to two spaces generally. Each space corresponds to production area 50, located at the front side in a vehicle traveling direction, and storage area 51, located at the rear side in a vehicle traveling direction for loading equipment, respectively. In storage area 51, for example, four 19-inch racks 21 may be installed so as to aggregate equipment. As rack 21 is facing rear door 49, rack 21 can be accessed by opening rear door 49 from the outside of OB-Box. In addition, rack 21 can be accessed from the inside of OB-Box. For example, the equipment loaded on rack 21 may be accessed from the outside of OB-Box, and cameras can be also put on the rack 21 from the inside of OB-Box, conveniently. In addition, as production area 50 of OB-Box may be covered by a sound insulating material, it is preferable that sound insulting material 52 may be attached to rack 21. In other words, the inside of OB-Box shall be separated as such as production area 50 and storage area 51 by rack assembly such as rack 21. As shown in FIG. 2, for example, the seats for operators up to nine (9) persons, each seat being able to face the side of the vehicle, can be arranged in production area 50. In addition, Electrical safety equipment may be provided to the power supply line in OB-Box, to meet the national legislation of the country using OB-Box.

In other words, OB-Box includes production area 50, storage area 51 and rear door 49. Production area 50 is located at the front side of OB-Box. Storage area 51 is located at the rear side of OB-Box. Storage area 51 may have rack 21, being attached sound insulating material 52 to at least a part of the wall of rack 21. At least a part of rack 21 may be made of acoustic insulation. Rack 21 may be facing to rear door 49. Rear door 49 may open towards the outside or slide to the lateral direction to avoid the interference with rack 21.

Figure 5:
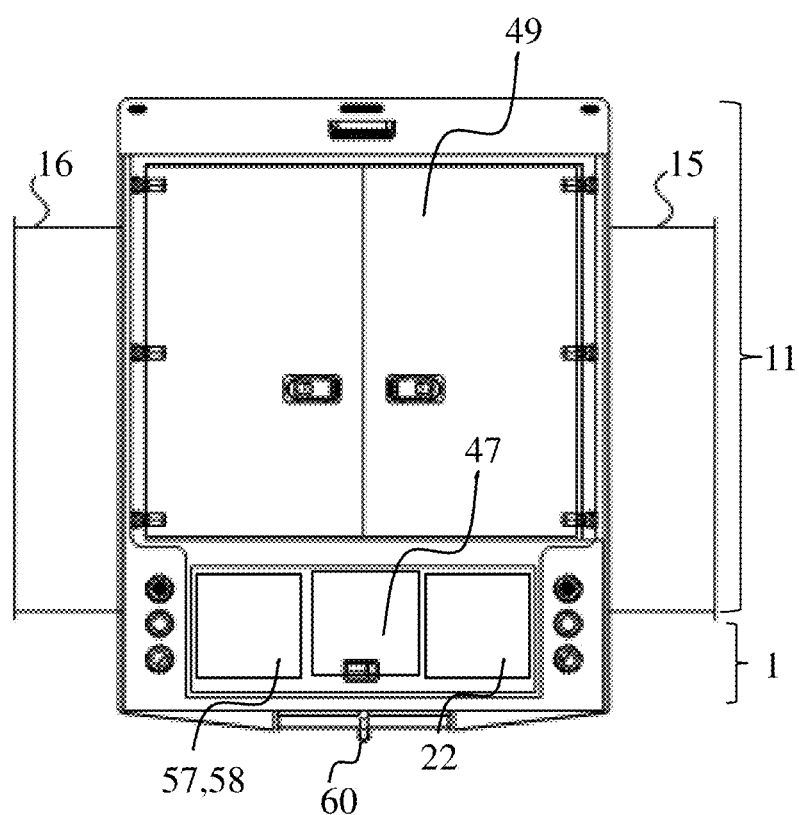
FIG. 5 illustrates a rear external representation of a mobile studio according to an embodiment of the present invention.

At Step S7, equipment including an electricity supply, an air conditioner, or lighting equipment is installed to OB-Box. Then, the exterior or interior of OB-Box may be finished by attaching some fittings including door 54, rear door 49 (hatch), window 53, electric retractable stairway 55, locker 22, or hydraulic jack 56. An electric power supply system may include battery 57 (Uninterruptible Power Supply), cable 58 having length of 40 m to connect an external power supply, and electric distribution board 23. As shown in FIG. 3 or 5, the electric power supply system except electric distribution board 23 may be installed in a rear lower space of OB-Box. Thus, the electric power supply system can be accessed from the rear outside of OB-Box. Outdoor unit of air conditioner 59 may be also disposed in a rear lower space of OB-Box. Conventionally, an outdoor unit of air conditioner has been disposed at an upper side, in front of the outside of production area 50, so as to extend above a driver's seat. Outdoor unit of air conditioner 59 according to an embodiment of the present invention may be disposed in OB-Box so that the appearance of OB-Box becomes the box-shape. Hitch 60 for connecting the following trailer may be attached at the center of the rear of OB-Box. By this future, the vehicle loading OB-Box can pull a trailer mounted with an electric generator.

Figure 18:
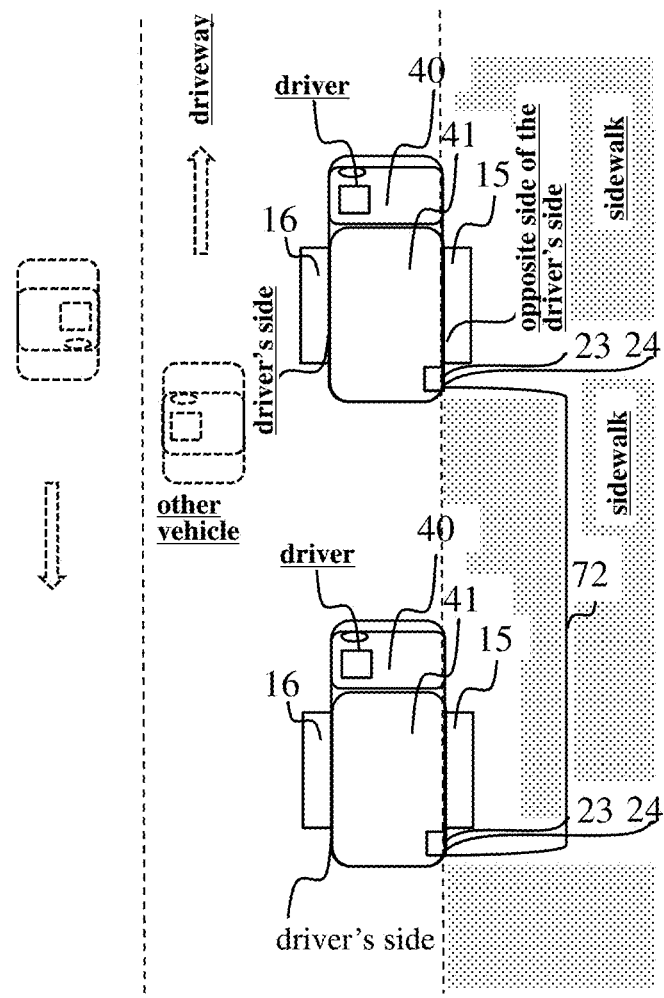
FIG. 18 illustrates the state that two mobile studios are connected to the cascade according to an embodiment of the present invention.

A side of the lower portion of OB-Box, stairway 55, locker 22 or air compressor 61 may be provided. The equipment may be secured to the lower side of the lower framework 1. A tripod, lighting equipment, or a battery etc. can be stored in locker 22, by opening a flap from the outside of OB-Box. In addition, electric distribution board 23 can be accessed by opening a flap from the outside of OB-Box, preferably from a sidewalk side or a pedestrian walkway side during parking. As illustrated in FIG. 18, electric distribution board 23 may face the sidewalk side while parking. In other words, electric distribution board 23 may be disposed on the opposite side of a driver's side when OB-Box is mounted on the vehicle. Each door 54, rear door 49 or the flap may be sealed during the state of being closed. The flap for electric distribution board 23 can be folded to the inside so as to prevent the rain blowing in.

Figure 6:
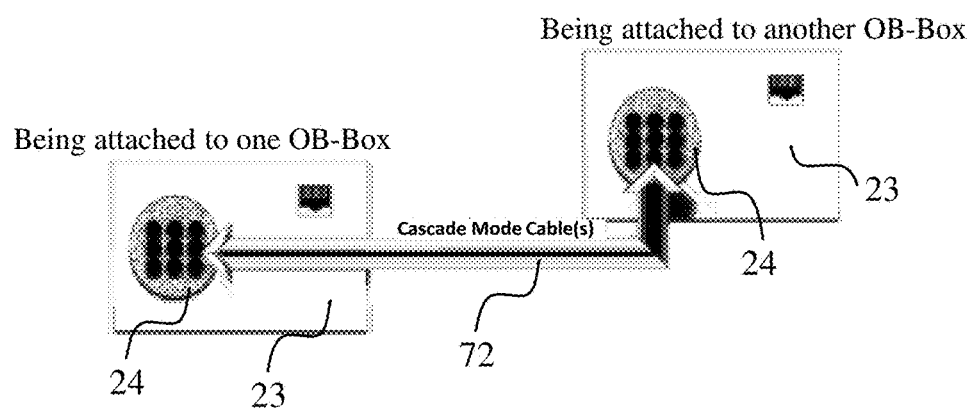
FIG. 6 is a schematic diagram of a cascaded connection interface according to an embodiment of the present invention.

Terminals, including a terminal for the electric power supply system, a terminal for connecting to external system, or a terminal for cascaded connection to another OB-Box, may be aggregated in electric distribution board 23. FIG. 6 is a schematic diagram of cascaded connection interface 24. In the example that emphasizes compatibility, cascaded connection interface 24 can support SDI (Serial Digital Interface), AES/EBU (coaxial or XLR), Genlock signal (coaxial), or RS-422 (RJ-45). Cascaded connection interface 24 may be connected the controls, including a camera video signal, an audio signal, a RCP (remote control panel) signal, a tally signal, an intercom signal, or other controls. For example, regarding a video signal and an audio signal, input (master) and output (slave) may be switched automatically. Regarding SDI or AES, the interface can also support upper class interface like 6G-SDI or multi-channel sound multiplex, under using the same physical I/F of BNC connectors.

In more advanced examples, the interface mentioned above may be replaced with Ethernet®-based network. To avoid a delay based at least in part on traffic contention between each protocol, backbone networks may be distributed to a video system, an audio system or other system. For example, regarding the video system, Audio Video Bridging (AVG) network can be connected each other via the 40G BASE-SR4 (LC connectors) etc. In the bandwidth of 40G bps, it is possible to transmit a 4K video signal using no less than 4 channels.

Since the AVB network system has a function of the device recognition or an admission control, plug-and-play can be realized. Device control for an audio or RCP, or an intercom may be connected each other by using 10G BASE or 1000 BASE interface. Furthermore, by using a wavelength division multiplexing, some signals may be connected by a single fiber. As illustrated in FIG. 6, electric distribution board 23 may have at least a terminal for cascaded connection to another mobile studio. For example, the terminals may include three Optical CON® connectors, one XLR connector, two SDI coaxial connectors, one serial transmission connector and one RJ-45 connectors for Ethernet®. As illustrated in FIG. 18, electric distribution board 23 may be disposed on the opposite side of a driver's side when the mobile studio is mounted on the vehicle. By connecting terminals of the different OB-Box with cascade mode cable 72, the cascaded connection of OB-Box can be provided.

Figure 17:
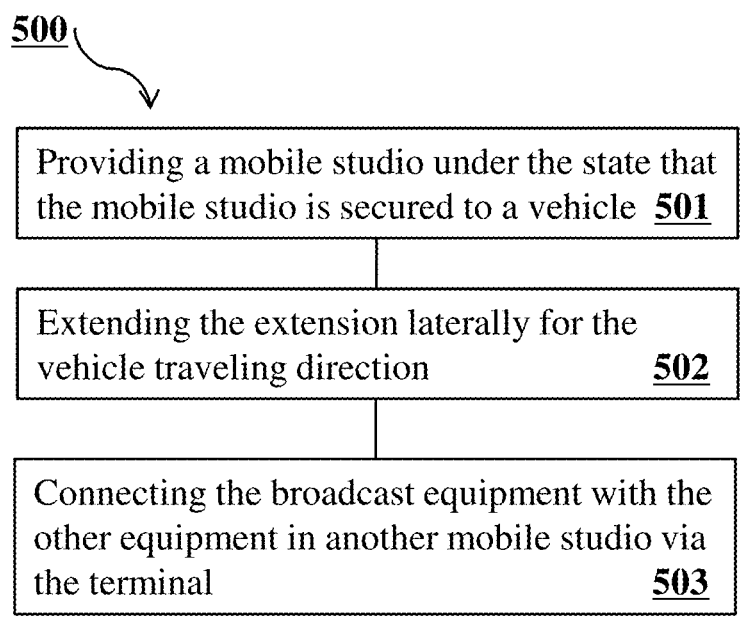
FIG. 17 is a flow diagram of an example method for using a mobile studio.

As illustrated in FIG. 17, the user can use OB-Box as follows:
(1) providing OB-Box under the state that OB-Box is secured to a vehicle (Step 501),
(2) extending the extension laterally for the vehicle traveling direction (Step 502); and
(3) connecting the broadcast equipment with the other equipment in another mobile studio via the terminal (Step 503).

Preferably, the terminal works to carry Audio Video Bridging (AVB) signal using AVB network.

Each extension 15, 16 may include an elastomeric packing (seal ring), contacting with a body of OB-Box closely at the expanding state or the retracting state of each extension 15, 16 respectively, for preventing rain water from intruding into production area 50. Hydraulic jack 56 may be stored under OB-Box, hydraulic jack 56 being used to maintain OB-Box horizontally during operation in the field. In addition, a panel for concealing cable or some decorations may be attached to the inside of OB-Box as an interior of OB-Box.

Figure 4:
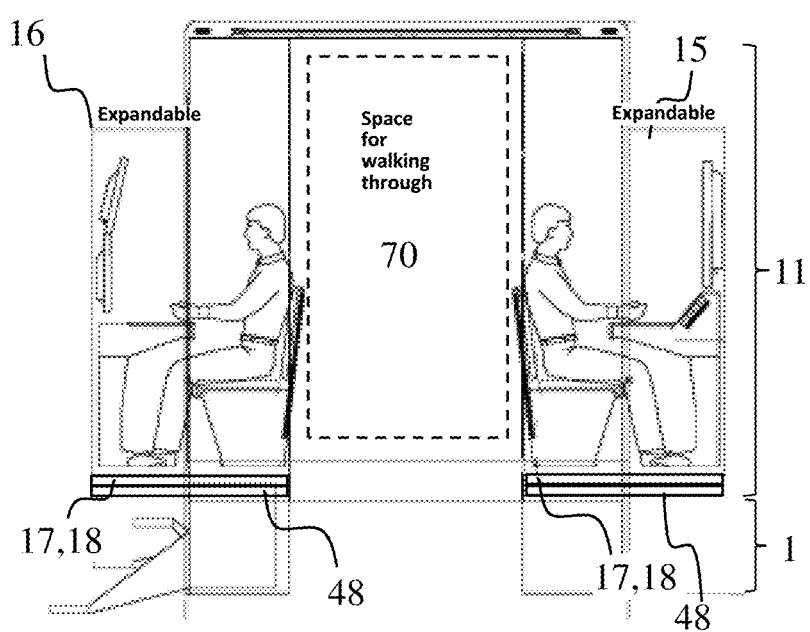
FIG. 4 illustrates an internal layout of a mobile studio according to an embodiment of the present invention (cross sectional view from the traveling direction of a vehicle).

At Step S8, the studio equipment, for example audiovisual equipment or transmission equipment, may be installed in OB-Box, then performed predetermined operation check thereof. As shown in FIGS. 2 to 4, extension 15 that is located on the right side for the forward direction may include some consoles 62 in line for video engineers, Console 62 being arranged so as to face the video engineer each. Console 62 may include remote control panel 63 for the camera control or panel 64 for controlling the slow motion. For example, eight of monitor displays 65 for displaying the image of each camera individually may be provided on the front wall of extension 15, being located on the right side for the forward direction. Extension 16, being located on the left side for the forward direction may include some consoles in line for audio engineers, switchers, directors or transmission engineers. Console 62 may include audio mixing panel 66, switching panel 67, computer 68 for editing video data, or computer 69 for managing. A monitor for displaying the information necessary for editing or a speaker may be provided on a front surface of the wall (not illustrated).

In a state that extension 15, 16 is drawn laterally, there may be space 70 for walking through to access the broadcast equipment easily. Each extension 15, 16 includes console 62 for controlling audiovisual equipment or transmission equipment, respectively. Console 62 may be facing the side wall so as to make space 70 for walking through while managing audiovisual equipment or transmission equipment. It is preferable that remote control panel 63 on console 62 for the camera control, and panel 64 on console 62 for controlling the slow motion, are arranged in line along the side wall, under facing monitor displays 65, in one of the extensions 15, 16.

Figure 13:
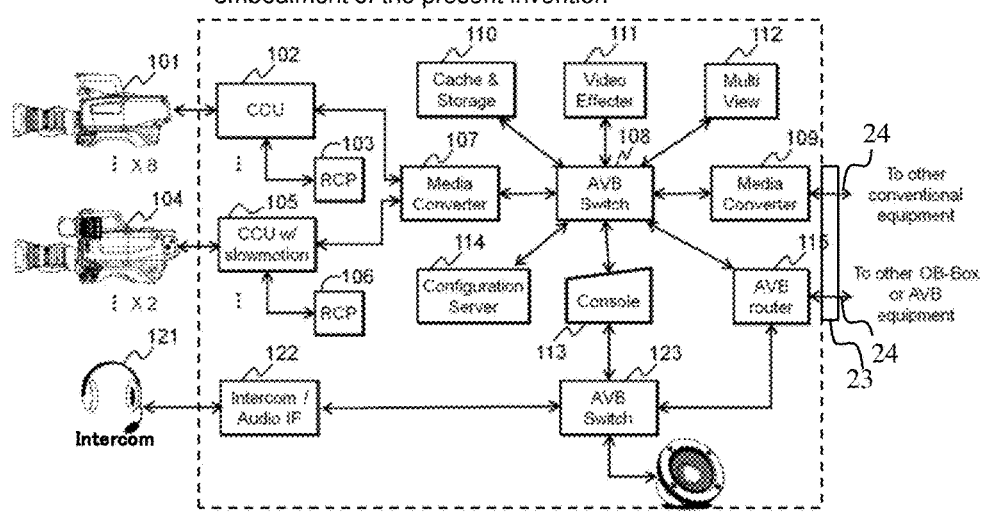
FIG. 13 illustrates the connection diagram of the broadcast equipment, installed in the mobile studio according to an embodiment of the present invention.
Figure 14:
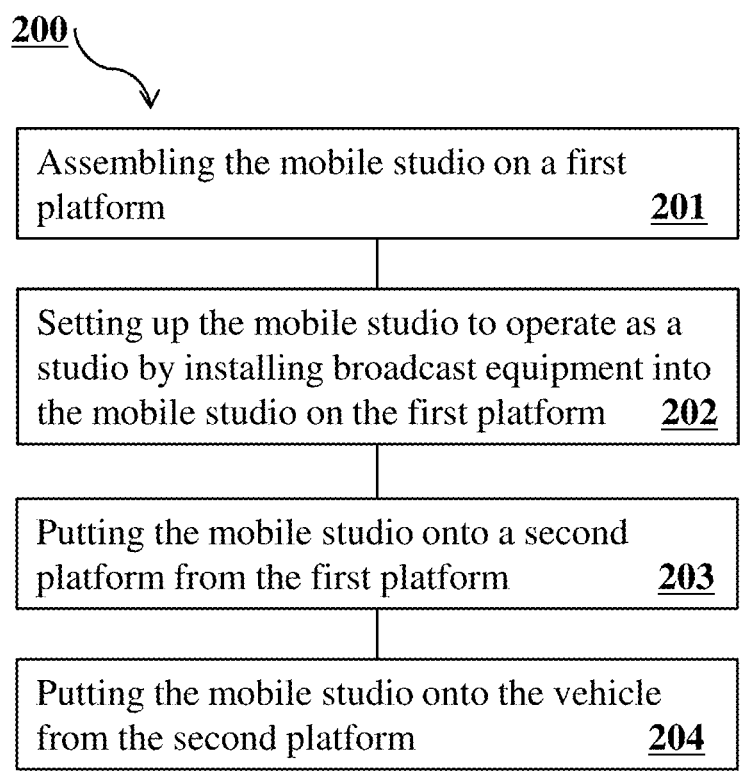
FIG. 14 is a flow diagram of an example method for using the mobile studio.

FIG. 13 illustrates the connection diagram of the broadcast equipment, installed in the mobile studio according to an embodiment of the present invention. For example, the main studio equipment to be installed in OB-Box may be electrically connected as shown in FIG. 13. In the configuration shown in FIG. 13, cache & Storage 110, Video Effecter 111, Multi View 112, Media Converter 107, 109, AVB router 115, Console 113 and Configuration Server 114 are connected in a star shape via AVB switch 108 having a large capacity, by adopting AVB network. Indeed, a small AVB switch for handling local traffic may be used in combination. A signal, such as a conventional SDI signal, may be input into media converter 107, 109. Media converter 107, 109 may compress the signal into a JPEG 2000 format or the like, if necessary. Then, media converter 107, 109 may send IP packets in conformity with the AVB standard, including compressed signal, to the network. In addition, media converter 107, 109 may decode IP packets to a signal such as a conventional SDI signal. Video effector 111, having a processor, such as a Graphical Processing Unit (GPU), may perform video effect processing such as a transition or a layout. AVB router 115 may work for equipment for interconnecting with other AVB network. Cascade connection interface 24 at electrical distribution board 23 may include a terminal for connecting a signal of media converter 109 with other conventional equipment. Cascade connection interface 24 at electrical distribution board 23 may include a terminal for connecting a signal of AVB router 115 with other OB-Box or AVB equipment.

At Step S9, a complete operation check and performance evaluation may be performed in the state that the electronic devices are set. The performance evaluation can include testing waterproof or drainage functions in the accommodated state and the expanded state of the extension 15, 16.

Figure 7:
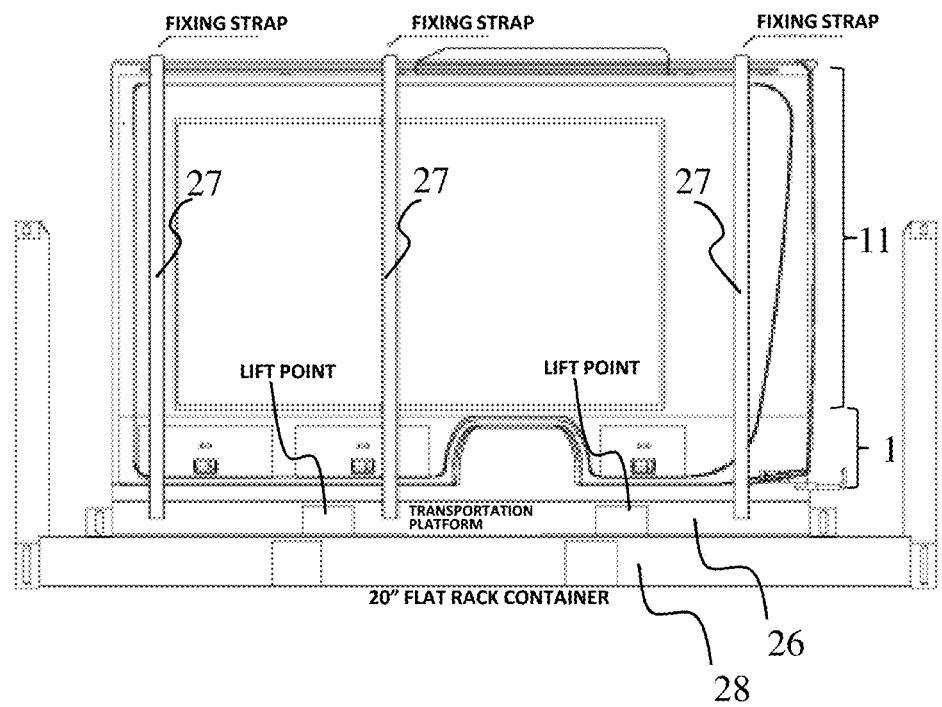
FIG. 7 illustrates the state that a mobile studio is mounted on a platform for transporting the mobile studio according to an embodiment of the present invention.

At Step S10, OB-Box may be placed and packaging on transportation platform 26 for transporting OB-Box, from the chassis or the first platform. OB-Box placed on transportation platform 26 for transporting is illustrated in FIG. 7. Transportation platform 26 may be a pallet being adapted to forklift transportation desirably, having approximately the same or slightly greater width as OB-Box. As the weight of OB-Box may be supported at four corners of bottom of OB-Box, at least four corners of bottom of OB-Box may contact with transportation platform 26. Transportation platform 26 may be constructed by assembling square pipes together into a lattice form. Incidentally, extension 15, 16 having a movable part, furniture such as a chair, part of the mounting equipment may be fixed for safe transportation, or may be packaged separately for safety. Thus, OB-Box may be secured to the transportation platform 26 by fixing strap 27. Furthermore, transportation platform 26, secured OB-Box thereon, can be placed on the sea transportable flat rack container 28, for example, the sea transportable flat rack container 28 has a length of 20 foot, then OB-Box being secured to the transportation platform 26 may be delivered to the buyer using the sea transportable flat rack container 28 if necessary.

[Flow of Mounting OB-Box onto the Chassis of Vehicle]

Figure 16:
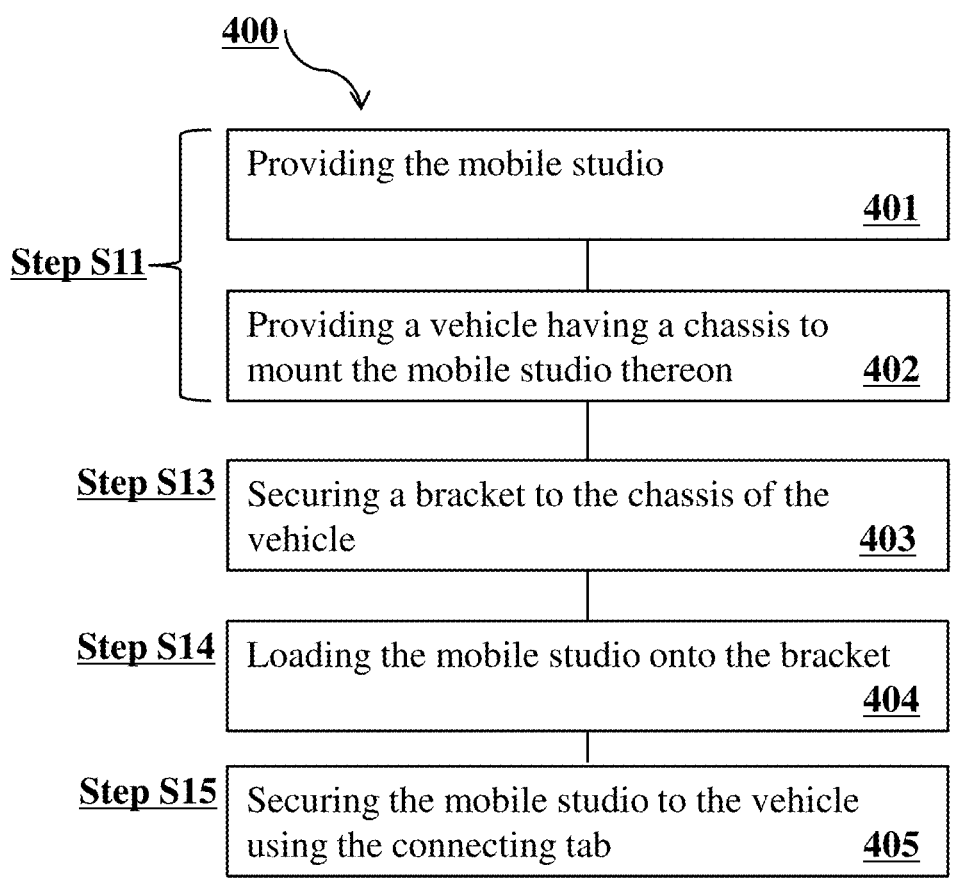
FIG. 16 is a flow diagram of an example method for using a mobile studio.

At Step S11, illustrated in FIG. 16, OB-Box and a vehicle are provided. OB-Box made by a third party according to an embodiment of the present invention is available. In addition, the vehicle made by a third party according to an embodiment of the present invention is available.

Figure 9:
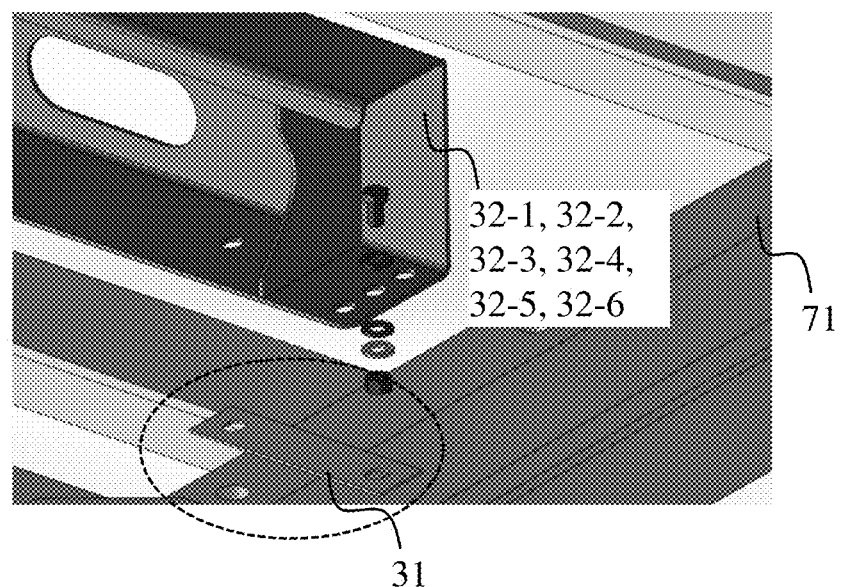
FIG. 9 illustrates how a bracket is secured to a chassis according to an embodiment of the present invention.

Firstly, the attachment points provided on chassis 71 of vehicle 40 may be confirmed. Chassis 71 of this embodiment may be formed in a ladder shape by welded plurality of steel square pipe. Chassis 71 may have, for example six mounting point 31, on the right and left of the chassis, respectively, as illustrated in FIG. 9. Each attachment point 31 may be constituted by a horizontal plate, having two or more bolt holes.

Figure 8:
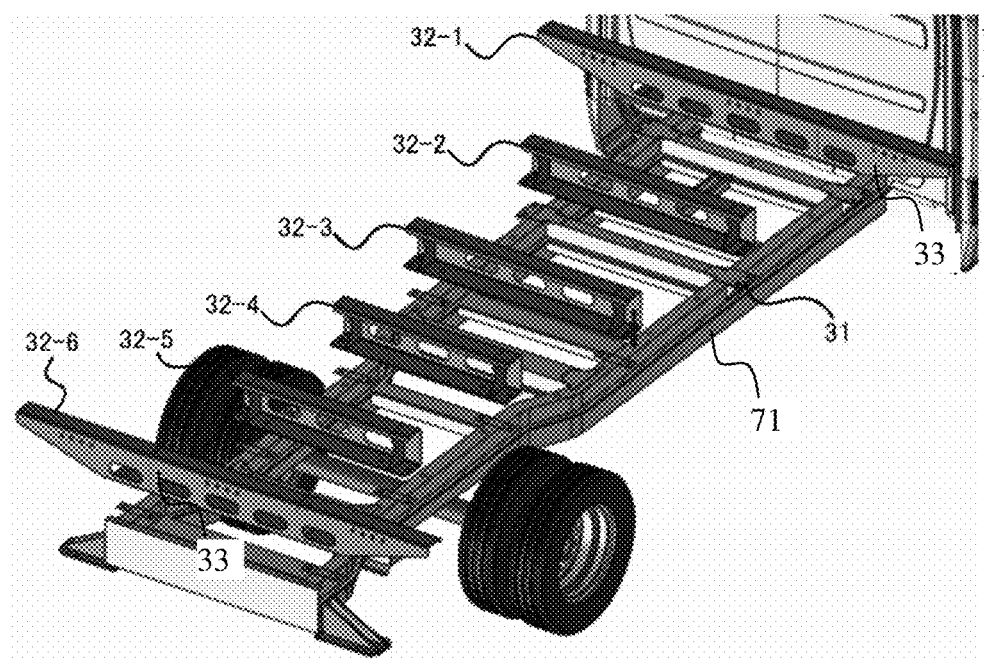
FIG. 8 is a perspective view of the chassis and brackets according to an embodiment of the present invention.
Figure 12:
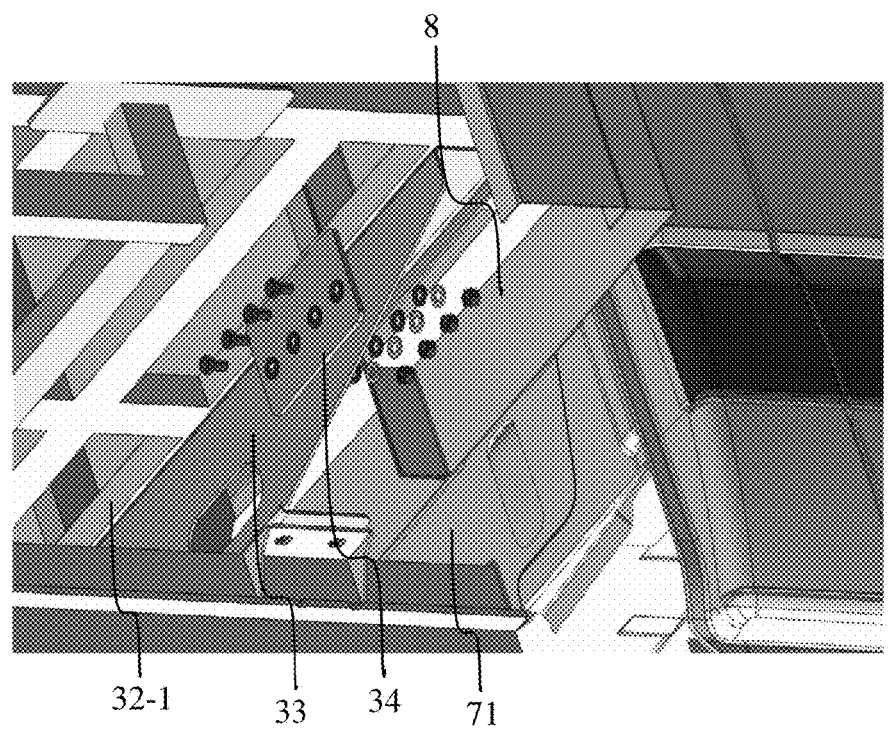
FIG. 12 illustrates how a lateral beam of a lower framework of a mobile studio is secured to a bracket of a chassis of a vehicle, via a connecting tab according to an embodiment of the present invention.

At Step S12, bracket 32-1, 32-2, 32-3, 32-4, 32-5, 32-6 for connecting OB-Box with chassis 71 of vehicle 40 may be fabricated. Each bracket 32-1, 32-2, 32-3, 32-4, 32-5, 32-6 is secured to chassis 71 at attachment point 31 of chassis 71, respectively. FIG. 8 is a perspective view of chassis 71 and bracket 32-1, 32-2, 32-3, 32-4, 32-5, 32-6. Each bracket 32-1, 32-2, 32-3, 32-4, 32-5, 32-6 may be formed into a channel having a substantially C-shaped cross-section, by welding a general structural steel plate (St 37), which was cut by laser and bent. Each bracket 32-1, 32-2, 32-3, 32-4, 32-5, 32-6 may have two or three connection points on side surfaces for connecting with OB-Box. In addition, the upper surface, side surface or bottom surface of each bracket 32-1, 32-2, 32-3, 32-4, 32-5, 32-6 may be a plane, respectively. Bracket 32-1 located forward most and bracket 32-6 located rearmost of the vehicle may be longer laterally than the other bracket 32-2, 32-3, 32-4, 32-5. Bracket 32-1, 32-2 may have a three-point connection surface. Two or more bolt holes may be provided in each connection surface 33. For example, as illustrated in FIG. 12, connection tab 34 may be attached to lateral beam 8 of planar upper-tier frame 43 of lower framework 1 so that a principal surface of connecting tab 34 is facing connecting surface 33 of bracket 32-1. Connecting tab 34 secures planar upper-tier frame 43 of lower framework 1 to bracket 32-1 from a horizontal direction with a bolt. According to this connecting structure, as main load of OB-Box is dispersed in the top surface of bracket 32-1, OB-Box is secured to the chassis of the vehicle while preventing the damage of connecting tab 34.

At Step S13, illustrated in FIG. 16, the bracket 32-1, 32-2, 32-3, 32-4, 32-5, 32-6 may be attached on the chassis 71 (403 in FIG. 16). Prior to attachment, no burrs or other obstacles to chassis 71 may be ensured. Further, it may be ensured that the mounting surface is clean. As shown in FIG. 9, securing each bracket 32-1, 32-2, 32-3, 32-4, 32-5, 32-6 to chassis 71 may be performed by using M12 hexagonal bolts and nuts.

At Step S14, illustrated in FIG. 16, OB-Box may be lifted with a crane, then OB-Box may be placed on bracket 32-1, 32-2, 32-3, 32-4, 32-5, 32-6, which were secured to chassis 71. Firstly, by checking the gross vehicle mass, it may be confirmed whether the pressure of the tire is appropriate. Next, as shown in FIG. 10, wire ropes may be connected with lifting points 42. For example, each eyebolt, being provided on the corner of the upper end of OB-Box may correspond to lifting point 42, respectively. Then, OB-Box may be lifted in a winch while keeping a horizontal state, by getting the gravity center with the wire ropes, to the suitable height that chassis 71 of vehicle 40 can be set below OB-Box, for example, from the ground to the height of the lowest 1 meter. Incidentally, if the rocker 22 is attached to OB-Box, it is better to remove them temporarily for a good workability. Then, OB-Box may be lowered for placing lower framework 1 of OB-Box to the upper surfaces of bracket 32-1, 32-2, 32-3, 32-4, 32-5, 32-6 so that connecting tabs 34 and connecting surfaces 33 are matched. As illustrated in FIG. 10, the mobile studio is connected with vehicle 40 using connecting tab 34 of the planar upper-tier frame 43 and bracket 32-1, 32-2, 32-3, 32-4, 32-5, 32-6 secured vehicle 40, without interfering with planar lower-tier frame 44. The oval and arrows indicated by the dashed line in FIG. 10, explains that there is no interference between bracket 32-1, 32-2, 32-3, 32-4, 32-5, 32-6 and planar lower-tier frame 44 when loading the mobile studio onto vehicle 40 using bracket 32-1, 32-2, 32-3, 32-4, 32-5, 32-6. As connecting tab 34 is attached to planar upper-tier frame 43 of lower framework 1, and a bottom surface of lateral beam 3, 8 is mounted on a top surface of bracket 32-1, 32-2, 32-3, 32-4, 32-5, 32-6, the load acting on each connecting tab 34 can be decreased corresponding to the weight of a part supported planar lower-tier frame 44. Connection tab 34 facilitates that the mobile studio is secured to vehicle 40 detachably.

Preferably, Connection tab 34 is attached to lateral beam 3, 8 of planar upper-tier frame 43 of lower framework 1.

At Step S15, illustrated in FIG. 16, each connecting tab 34, projected from the bottom surface of lower framework 1 is secured to connecting surface 33 of bracket 32-1, 32-2, 32-3, 32-4, 32-5, 32-6, using bolts, respectively. Bracket 32-1, 32-2, 32-3, 32-4, 32-5, 32-6 is connected to upper-tier frame 43 of lower framework 1 without interfering with lower-tier frame 44 of lower framework 1. The connecting tabs 34 may be disposed at a plurality of connecting points of upper-tier frame 43 of lower framework 1. For example, connecting tab 34 is illustrated in the circle of the dashed line in FIG. 11. FIG. 11 is a perspective view of a lower framework according to an embodiment of the present invention, the perspective view showing the bottom surface of lower framework 1. We can see connecting tabs 34 disposed lateral beam 3, 8 of upper-tier frame 43, for connecting bracket 32-1, 32-2, 32-3, 32-4, 32-5, 32-6 without interfering with lower-tier frame 44 of lower framework 1.

Each connecting tab 34 may be fixed by a plurality of M16 hexagonal bolts and nuts at each point, respectively as in FIG. 12. Connecting tab 34 may be accessed by a technician from the lower side. After fixing OB-Box to chassis 71 in this way, rocker 22 that was detached temporarily at Step S14, may be attached again.

Finally, at Step S16, the appliance which became unnecessary, such as fasteners and lifting point 42 may be detached. Equipment such as a satellite link, which has been detached for transportation, may be attached again. Electrical wiring with vehicle 40 may be performed and the operation may be confirmed. For example, the electrical wiring may be performed for turning on/off a brake lamp, limiting the operation of the extender for extension 15, 16 or hydraulic jack 56, while vehicle 40 runs, and power supply for an electric retractable stairway 55 or outdoor unit of air conditioner 59.

Preferred embodiments of the invention are specified in the following paragraphs:

1. A mobile studio, including:
   a lower framework, constructed by a steel Rahmen structure, the lower framework including a connecting tab to secure the mobile studio to a vehicle; and an upper framework, constructed by an aluminum Rahmen structure, secured to the lower framework, the upper framework supporting at least a production area in the mobile studio;

wherein the production area includes an extension having a console of broadcast equipment and a slider for being drawn laterally while managing the broadcast equipment and retracted into the production area while transporting the mobile studio.

2. The mobile studio according to paragraph 1, the upper framework further supports a storage area.

3. The mobile studio according to paragraph 2, the storage area includes rack assembly, facing a rear door, at least part of the rack assembly being made of sound insulating material.

4. The mobile studio according to any one of paragraph 1 to 3, the lower framework supports an electric distribution board having at least a terminal for cascaded connection to another mobile studio, the electric distribution board being disposed on the opposite side of a driver's side when the mobile studio is mounted on the vehicle.

5. The mobile studio according to paragraph 4, the terminal works to carry Audio Video Bridging (AVB) signal using AVB network.

6. The mobile studio according to any one of paragraph 1 to 5, wherein the connecting tab is attached to a planar upper-tier frame of the lower framework.

7. The mobile studio according to any one of paragraph 1 to 6, wherein the connecting tab is attached to a lateral beam of a planar upper-tier frame of the lower framework.

8. The mobile studio according to any one of paragraph 1 to 7, lifting points are provided at least at the four corners of a roof, supported by the upper framework.

9. A method for manufacturing a mobile studio, including the steps of:
(1) constructing a lower framework, having steel Rahmen structure with a connecting tab to secure the mobile studio to a vehicle;
(2) constructing an upper framework, having aluminum Rahmen structure to support at least production area including an extension; and
(3) securing the upper framework to lower framework.

10. A method for using a mobile studio, including the steps of:
(1) providing a mobile studio,
the mobile studio includes a lower framework, constructed by a steel Rahmen structure, the lower framework having a connecting tab to secure the mobile studio to a vehicle; and an upper framework, constructed by an aluminum Rahmen structure, secured to the lower framework, the upper framework supporting at least a production area in the mobile studio; wherein the production area includes an extension having a console of broadcast equipment and a slider for being drawn laterally while managing the broadcast equipment and retracted into the production area while transporting the mobile studio;
(2) providing a vehicle having a chassis to mount the mobile studio thereon;
(3) securing a bracket onto the chassis of the vehicle;
(4) loading the mobile studio onto the bracket; and
(5) securing the mobile studio to the vehicle using the connecting tab.

11. The method according to paragraph 10, wherein step (4), loading the mobile studio to the bracket is performed by lifting the mobile studio in a winch, then lowering the mobile studio to the bracket.

12. A method for using a mobile studio, including the steps of:
(1) providing a mobile studio under the state that the mobile studio is secured to a vehicle, the mobile studio includes a lower framework, constructed by a steel Rahmen structure; and an upper framework, constructed by an aluminum Rahmen structure, the upper framework supporting at least a production area and storage area, the production area and the storage area is separated by a rack assembly.
wherein the production area includes an extension having broadcast equipment.
wherein the lower framework supports an electric distribution board having at least a terminal for cascaded connection to another mobile studio, the electric distribution board being disposed on the opposite side of a driver's side;
(2) extending the extension laterally for the vehicle traveling direction; and
(3) connecting the broadcast equipment with the other equipment in another mobile studio via the terminal.

13. The method according to paragraph 12,
wherein the terminal works to carry Audio Video Bridging (AVB) signal using AVB network.

14. A mobile studio for being mounted onto a vehicle, including:
a lower framework constructed by steel Rahmen structure;
an upper framework constructed by aluminum Rahmen structure; and
a bracket for connecting the lower framework with a vehicle,
wherein the mobile studio is formed into a rectangular parallelepiped box shape.

15. The mobile studio according to paragraph 14, wherein the lower framework includes a planar upper-tier frame constructed by putting a first longitudinal beam and a first lateral beam together, a planar lower-tier frame constructed by putting a second longitudinal beam and a second lateral beam together, and a plurality of columns for connecting the upper-tier frame and the lower-tier frame. The bracket is connected to the upper-tier frame without interfering with the lower-tier frame.

16. The mobile studio according to paragraph 15, wherein lifting points are provided at least at the four corners of a roof, supported by the upper framework.

17. A method for using the mobile studio, the method including:
assembling the mobile studio according to paragraph 16 on a first platform;
setting up the mobile studio to operate as a studio by installing broadcast equipment into the mobile studio on the first platform;
putting the mobile studio onto a second platform from the first platform; and
putting the mobile studio onto the vehicle from the second platform.

INDUSTRIAL APPLICABILITY

The aspect of the invention may be suitable to the relay vehicles using in the media industries such as television or the field of content production. Industrial applicability is not limited thereto, such as a vehicle for the remote-controlled drone or robot, the outfitting vehicle for various special applications.

DESCRIPTION OF SYMBOLS

1: lower framework, 2, 4, 7: longitudinal beam, 3, 5, 8, 9: lateral beam, 5a: linear roller guide, 6, 10: column, 11: upper framework, 13: body, 15, 16: extension, 17, 18: lateral beam, 19: linear roller guide, 20: wheel, 21: rack, 22: locker, 23: electric distribution board, 24: cascaded connection interface, 26: transportation platform, 27: fixing strap, 28: sea transportable flat rack container, 31: attachment point, 32-1, 32-2, 32-3, 32-4, 32-5, 32-6: bracket, 33: connecting surface, 34: connecting tab, 40: vehicle, 41: mobile studio, 42: lifting point, 43: planar upper-tier frame, 44: planar lower-tier frame, 47: rear lower space, 48: slider, 49: rear door, 50: production area, 51: storage area, 52: sound insulating material, 53: window, 54: door, 55: stairway, 56: hydraulic jack, 57: battery, 58: cable, 59: outdoor unit of air conditioner, 60: hitch, 61: air compressor, 62: console, 63: remote control panel, 64: panel, 65: monitor display, 66: audio mixing panel, 67: switching panel, 68: computer, 69: computer, 70: Space, 71: chassis, 72: cascade mode cable, 101, 104: Camera, 102: Camera Control Unit (CCU), 103, 106: RCP, 107, 109: Media Converter, 108, 123: AVB Switch, 110: Cache & Storage, 111: Video Effecter, 112: Multi View, 113: Console, 114: Configuration Server, 115: AVB router, 121: Intercom, 122: Intercom/Audio IF

What is claimed is:

1. A mobile studio, comprising:
   a lower framework including:
      a planar upper-tier frame constructed of a first longitudinal beam and a first lateral beam, and
      a planar lower-tier frame constructed of a second longitudinal beam and a second lateral beam,
         wherein the planar upper-tier frame is connected with the planar lower-tier frame by a plurality of columns, and
         wherein the planar upper-tier frame includes a connecting tab to securely mount the mobile studio to a vehicle; and
   an upper framework, secured to the lower framework, supporting at least a production area in the mobile studio.

2. The mobile studio of claim 1, wherein the upper framework further supports a storage area.

3. The mobile studio of claim 2,
   wherein the storage area includes a rack assembly facing a rear door, and
   wherein at least a part of the rack assembly is made of sound insulating material.

4. The mobile studio of claim 3,
   wherein the lower framework supports an electric distribution board including at least a terminal for a cascaded connection to another mobile studio, and
   wherein the electric distribution board is disposed on an opposite side of a driver's side when the mobile studio is mounted on the vehicle.

5. The mobile studio of claim 4, wherein the terminal carries an Audio Video Bridging (AVB) signal using AVB network.

6. The mobile studio of claim 1, wherein the production area includes an extension, being retracted into the production area so as to form a box-shaped mobile studio while transporting the mobile studio.

7. The mobile studio of claim 1, wherein the mobile studio is removably connected with the vehicle using the connecting tab of the planar upper-tier frame and a bracket secured the vehicle, without interfering with the planar lower-tier frame.

8. The mobile studio of claim 1, further comprising lifting points at least at the four corners of a roof, supported by the upper framework.

9. A method for using a mobile studio, comprising the steps of:
   (1) providing a mobile studio, wherein the mobile studio includes a lower framework, including:
      a planar upper-tier frame constructed of a first longitudinal beam and a first lateral beam, and
      a planar lower-tier frame constructed of a second longitudinal beam and a second lateral beam,
         wherein the planar upper-tier frame is connected with the planar lower-tier frame by a plurality of columns, and
         wherein the planar upper-tier frame includes a connecting tab to secure the mobile studio to a vehicle, and
      an upper framework, secured to the lower framework, supporting at least a production area in the mobile studio;
   (2) providing a vehicle that includes a chassis to mount the mobile studio thereon;
   (3) securing a bracket onto the chassis of the vehicle;
   (4) loading the mobile studio onto the bracket; and
   (5) securing the connecting tab of the planar upper-tier frame of the lower framework to the bracket of the vehicle.

10. The method of claim 9, wherein the step (4), loading the mobile studio onto the bracket is performed by:
    lifting the mobile studio in a winch, and
    lowering the mobile studio to the bracket.

11. A method for using a mobile studio, comprising the steps of:
    (1) securing a mobile studio to a vehicle, wherein the mobile studio includes a lower framework and an upper framework, the lower framework has a planar upper-tier frame connected with the vehicle, the upper framework supports at least a production area and storage area, the production area and the storage area is separated by a rack assembly,
       wherein the production area includes an extension having broadcast equipment, and
       wherein the lower framework supports an electric distribution board that includes at least a terminal for a cascaded connection to another mobile studio, the electric distribution board being disposed on the opposite side of a driver's side;
    (2) extending the extension in a direction lateral to the vehicle traveling direction; and
    (3) connecting the broadcast equipment with the other equipment in another mobile studio via the terminal.

12. The method of claim 11, wherein the terminal carries an Audio Video Bridging (AVB) signal using AVB network.

* * * * *